(12) United States Patent
Zippold et al.

(10) Patent No.: US 7,186,951 B2
(45) Date of Patent: Mar. 6, 2007

(54) SENSOR STRUCTURE AND SENSOR ARRANGEMENT FOR MEASURING FLOW DATA ON A FLOW BODY

(75) Inventors: Herbert Zippold, Bruckmuehl (DE); Horst Odebrecht, Taufkirchen (DE); Roland Lang, Woerth (DE); Ronald Gerbig, Riemerling/Ottobrunn (DE); Heinz Meister, Dorfen (DE); Manfred Palik, Geretsried (DE); Hermann Wandel, Unterhaching (DE)

(73) Assignee: EADS Deutschland GmbH, Ottobrunn (DE)

( * ) Notice: Subject to any disclaimer, the term of this patent is extended or adjusted under 35 U.S.C. 154(b) by 141 days.

(21) Appl. No.: 10/478,101

(22) PCT Filed: May 4, 2002

(86) PCT No.: PCT/DE02/01618

§ 371 (c)(1),
(2), (4) Date: Jul. 23, 2004

(87) PCT Pub. No.: WO02/095337

PCT Pub. Date: Nov. 28, 2002

(65) Prior Publication Data

US 2004/0244477 A1    Dec. 9, 2004

(30) Foreign Application Priority Data

May 19, 2001 (DE) ................. 101 24 530

(51) Int. Cl.
*H05B 3/00* (2006.01)

(52) U.S. Cl. .............. 219/201; 219/494; 219/538; 219/546; 244/723; 73/861.65; 73/170.02

(58) Field of Classification Search ............. 219/201, 219/494, 534, 538, 546, 548, 552; 73/861.65, 73/170.02; 244/123.8, 117 A; 430/258
See application file for complete search history.

(56) References Cited

U.S. PATENT DOCUMENTS 3,400,583 A    9/1968  Stanley et al.

(Continued)

FOREIGN PATENT DOCUMENTS

DE    2138495    1/1973

(Continued)

OTHER PUBLICATIONS

International Search Report.

*Primary Examiner*—Robin Evans
*Assistant Examiner*—Leonid M. Fastovsky
(74) *Attorney, Agent, or Firm*—Crowell & Moring LLP

(57) ABSTRACT

Sensor structure of a flow body protruding into a current for carrying out measurements of flow states, containing a structural part (1) with at least two measuring orifices (5), to which transfer lines (7) are coupled, which guide the flow medium from the measuring orifices (5) to a pressure converter system (13) for the purpose of determining the flow states. The outer shell (3) of the structural part (1) contains two areas (21, 22), which are arranged behind each other viewed in the direction of flow, wherein the first area (21) has greater thermal conductivity than the second area (22). Within the first area (21) heating elements (31) are arranged on the structural part (1), and are connected with a temperature control circuit with the temperature on the surface of the first area (21) as a control variable.

14 Claims, 3 Drawing Sheets

U.S. PATENT DOCUMENTS

| | | | |
|---|---|---|---|
| 4,388,388 A | * 6/1983 | Kornbau et al. | 430/258 |
| 4,458,137 A | 7/1984 | Kirkpatrick | |
| 4,949,920 A | * 8/1990 | Schindel et al. | 244/117 A |
| 5,543,183 A | 8/1996 | Streckert et al. | |
| 6,038,932 A | * 3/2000 | Wandel et al. | 73/861.65 |
| 6,375,120 B1 | * 4/2002 | Wolnek | 244/123.8 |
| 6,376,807 B1 | * 4/2002 | Hong et al. | 219/444.1 |

FOREIGN PATENT DOCUMENTS

| | | |
|---|---|---|
| DE | 2827104 | 4/1987 |
| DE | 196 40 606 | 9/1997 |
| EP | 0 229 534 | 7/1987 |
| JP | 04329002 | * 11/1992 |

* cited by examiner

SENSOR STRUCTURE AND SENSOR ARRANGEMENT FOR MEASURING FLOW DATA ON A FLOW BODY

BACKGROUND AND SUMMARY OF THE INVENTION

This application claims the priority of German Patent Document No. 101 24 530.0, filed May 19, 2001, and PCT/DE02/01618 filed May 4, 2002 the disclosure of which is expressly incorporated by reference herein, respectively.

The invention relates to a sensor structure for carrying out measurements of air or flow data, such as pressure levels, on the exterior surface of a flow body protruding into a flow, which can be an airplane or generally an air vehicle or any random body exposed to a flow such as a wing, as well as an air vehicle with the sensor structure.

Air data measurements in airplanes have generally been conducted with external probes, which can be integrated particularly inexpensively and in a structurally simple manner. They also offer the advantage that, with appropriate arrangement on the airplane's fuselage, relatively little effort is required is required for the compensation of local influencing factors of the air flow. Such external probes, however, have disadvantages in many cases that are significant for future airplanes. For example, in the hypersonic range the thermal stability of these external probes is not sufficient. In the regular flight range and in military application areas, problems arise with regard to thermal control ability, the EMC and lightning stroke stability, as well as the signature that these external probes have towards radar devices. With external probes there is also additionally always the risk of ice formation, which impairs the safety of the airplane. External probes furthermore require a relatively large space because they also require components for signal pre-processing and signal processing as well as for heating the probes. Furthermore the angle of incidence can be measured only in a limited region with external probes. As an example, airplanes fly at large attach angles of attack during take-off and landing or during air war. Therefore, external probes are not able to determine the aerodynamic flight condition with sufficient accuracy.

It is therefore the object of the invention to create a sensor structure for a flow body as well as an arrangement of the same in the flow body, eliminating the above-mentioned disadvantages.

BRIEF DESCRIPTION OF THE DRAWINGS

The following describes the invention based on the attached figures, wherein.

DETAILS DESCRIPTION OF THE PREFERRED EMBODIMENT

Figure 1:
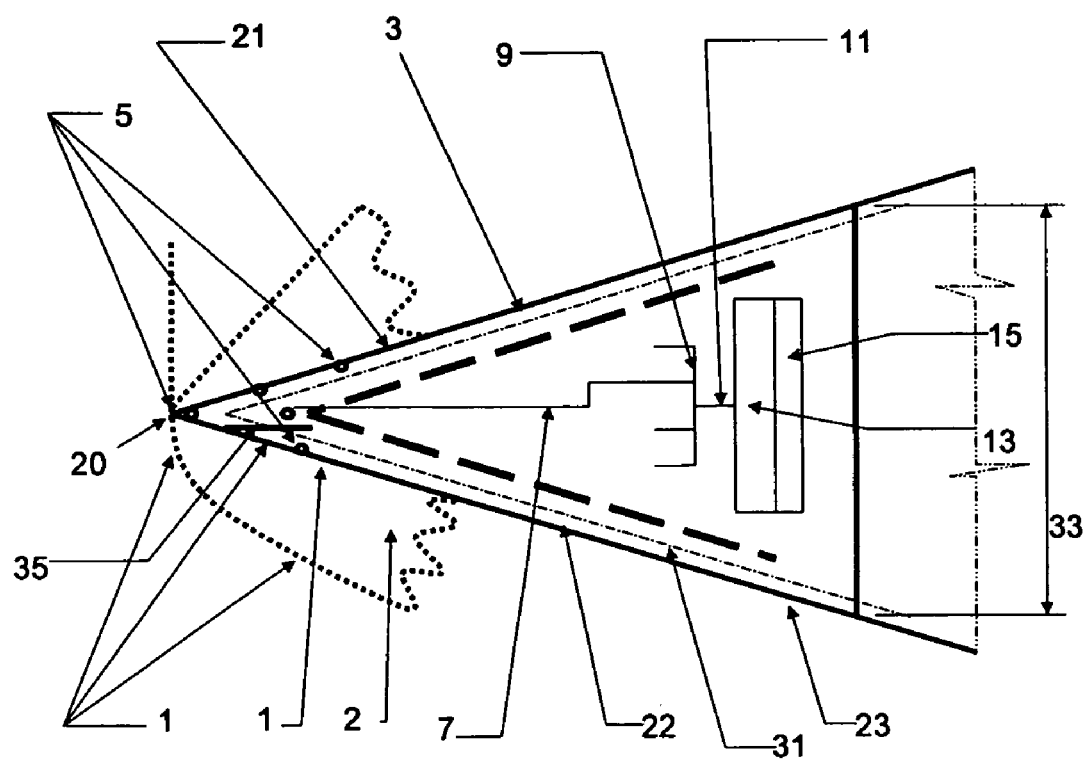
FIG. 1 is a longitudinal section through the fuselage tip of an airplane with a diagrammatic depiction of one embodiment of the invented sensor structure and the elements for integrating the same into the airplane structure or the structural part.

FIG. 1 shows a structural part 1 of the invented sensor structure 2 of an airplane, which in particular is the front part of the fuselage tip of an airplane, e.g., a radome. The structural part 1, however, can also be other structural components of an airplane, especially those protruding into the air flow. In general, the structural part can be part of a flow body, i.e., a body of random application that is exposed to a current, wherein the flow data or air data on this body are to be measured. The flow medium can generally have a gaseous, such as air, or liquid state of aggregation, such as water or oil.

The structural part 1 containing the areas 21 and 22, which are arranged behind each other, can be formed in the exterior surfaces optionally from normal bodies, e.g., conical, or irregular bodies, e.g., bodies with free-forming surfaces, or from bodies that are composed of these.

The structural part 1 contains an outer shell 3 with several measuring orifices 5 that are distributed both in the axial and in the radial directions. The measuring orifices 5 are precision bores. A transfer line 7, for example, in the form of capillaries, extends from each measuring orifice 5, respectively, so that a multitude of transfer lines 7 run in the structural part 1. They join together in a support element 9 in the interior of the structural part 1, wherein the transfer lines 7 are connected with one end on the support element 9 in a pressure-sealed manner. From the support element 9, at least one corresponding pneumatic pressure transmission path 11 extends to a pressure converter system 13, in which the pressures that are transmitted via the transfer lines 7 are transformed into electric variables.

Lines protrude from the pressure converter system 13 to a data processing system 15, in which the local pressures occurring on each measuring orifice 5 or other flow variables are converted into the air data that is to be determined. The lines (not shown) can be designed as analog lines or also as data transmission lines. In the latter case, corresponding transmitters and receivers are to be provided. Data transmission can also be realized with optical wave guides due to the high sampling rates that are required. High sampling rates ensure large resolution so that the required accuracy of the pressure measurement is accomplished.

The measuring orifices 5 have a circular section or other planar shapes, however, with roughly equal surface areas in their cross-section. The cross-section area is in the range from 0.03 to 30 $mm^2$ when using a circular section. The circular diameters are preferably in the range between 1 and 1.8 mm. In the case of other planar shapes, the cross-section areas are preferably 0.8 to 2.6 $mm^2$. On the orifice edge, a corner geometry of a maximum radius of 0.1 mm is provided. The tolerance settings of the orifice width and/or the orifice length or the orifice diameter should not exceed 0.1 mm.

Figure 2:
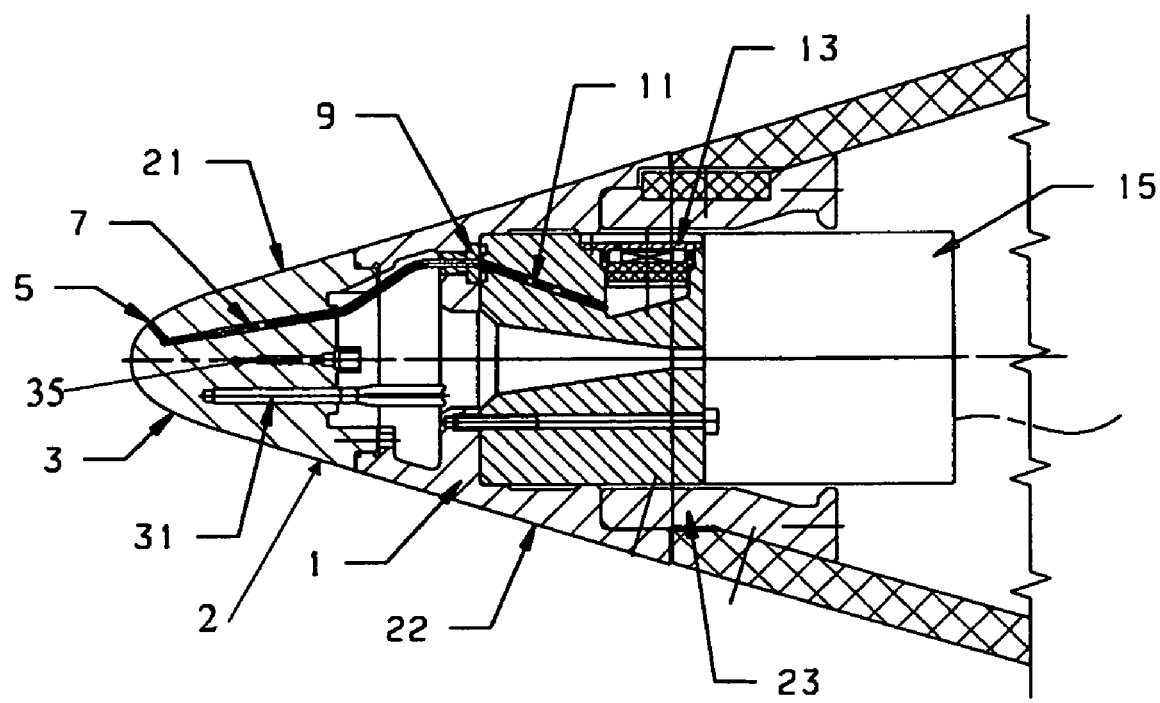
FIG. 2 is a longitudinal section with detailed depiction for one embodiment of the invented sensor structure.
Figure 3:
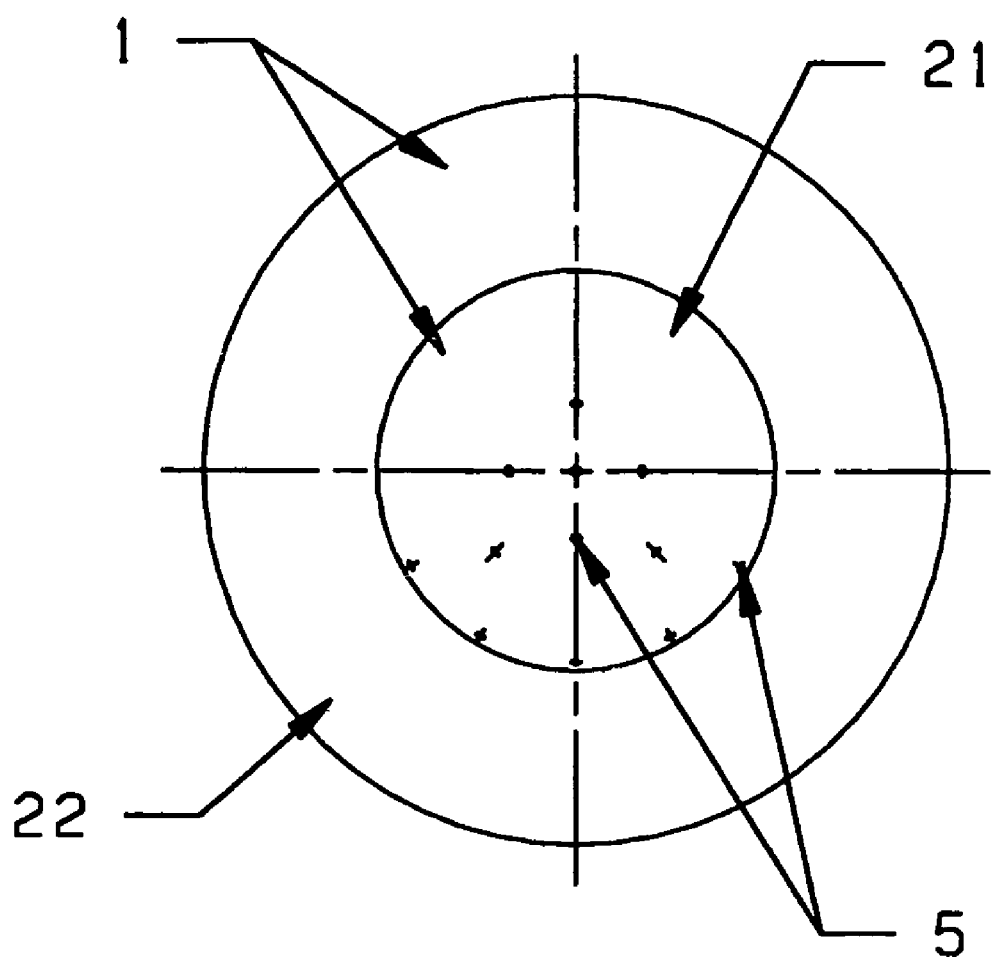
FIG. 3 is a frontal view of one embodiment of the invented sensor structure.

The outer shell 3 is made of several different materials in order to achieve sectionally adjusted thermal conductivity levels of the outer shell 3 viewed from the tip 20 of the structural part 1 in the direction of flow (external flow) to be able to adjust the temperature distribution in accordance with the required output levels, which differ across the structural zones. A first area or frontal area 21, which is located on the tip 20 or on the structural part protruding into the current, is made of a metallic alloy, which ensures that lightning does not cause any impermissible surface changes (e.g., local melting open or closed of bores). The invented functionality of the first area 21 is achieved among other things with alloy-related evaporative heat loss of the surface or magnetic lightning influence by using suitable ferromagnetic materials. In the case of alloy-related evaporative heat loss, preferably wolfram base materials with alloy additives such as copper, nickel, iron, cobalt are used for the first area 21 as support structure in sufficient quantity and suitable distribution in the support structure. The alloy additives evaporate with lightning strikes so that too high a temperature increase in the support structure is avoided and thus the form consistency of the bores and the overall structure is maintained. Apart from lightning resistance, the material for the area 21 must exhibit good thermal conductivity. In case the structural part 1 is a fuselage tip, preferably five to twenty measuring orifices 5 are located in the first area 21, wherein they are distributed in the axial and circumferential directions (FIGS. 2 and 3).

In the second area 22 of the outer shell 3, which is located axially behind the first area 21 viewed in the direction of flow, lower thermal conductivity of the outer shell 3 is achieved. The second area 22 is made of a material such as e.g., non-rusting steel or a nickel or cobalt master alloy, wherein the thermal expansion coefficient of the area 22 with simultaneously low thermal conductivity compared to the thermal coefficient of the area 21 is provided such that the structural tension between the areas 21 and 22 is not too large.

The third area 23, which follows when viewed in the direction of flow, forms the connecting structure to the airplane element, for example, the airplane fuselage, to which the structural part 1 is attached. The third area 23 is made of a material with sufficient firmness and corrosion resistance. Suitable for this are titanium alloys such as e.g., Ti-6Al-4V or stainless steels or nickel master alloys. The third area 23 has a greater or smaller thermal conductivity than the second area 22. The function of the third area is not primarily that of heat removal, but the third area ensures a structurally robust transition from the second area to the airplane fuselage.

Due to the lower thermal conductivity in the direction of flow from the first area 21 to the second area 22, the highest possible effective thermal output utilization and simultaneously the lowest possible thermal stress of the sensors/pressure converters is accomplished. Pursuant to the invention, a minimum temperature of 95° C. or 100° C. can be adjusted for the frontal area, causing moisture that occurs on the exterior surface of the sensor structure or in the inlet area of the measuring orifices to evaporate. Thermal transport from the first area via the second area 22 into the pressure converter area is reduced such by the thermal conductivity of the areas 21, 22 that a maximum temperature provided in the second area 22 is not exceeded. The maximum temperature of the second area 22 is fixed as a function of the application and is preferably in the range of 70 to 120° C.

For the frontal area 21 a maximum temperature of preferably 160° C. is provided for on the exterior surface. By dividing the area into the first area 21 and second area 22 pursuant to the invention, a specified temperature decrease is achieved. A preferred application provides for a decrease from the first (21) to the second (22) area of a minimum of 30° C. to a maximum of 90° C. for high-performance aircraft. This ensures the protection of temperature-sensitive measuring elements and computer elements of the measuring system 13 and of the data processing system 15.

The realized thermal conductivity was selected between 100 and 205 W/mK (for area 21) and between 90 and 15 W/mK (for area 22).

In order to ensure protection against EMC (electromagnetic compatibility) and lightning, the first 21, second 22 and third 23 areas are designed electrically conductive. Compared to the state of the art it is beneficial according to the present invention that no electrically conductive materials have to be installed additionally in an outer shell because pursuant to the invention the outer shell 3 itself is designed to be electrically conductive.

Pursuant to the invention additionally heating elements 31 are provided, which are attached on the inside and along the area 21 both in its axial and in the radial directions. The heating elements 31 are integrated into the interior structure of the area 21 with a high-temperature adhesion process or soldering process (see FIG. 2).

Adhesive, soldering and/or screw assemblies are provided for connecting the capillaries 7 with the bores. Preferably special bonding techniques are employed. The capillaries 7 are connected with the bores 5 of the outer shell 3 especially through high-temperature soldering; as shown in FIG. 2.

With the applied integral design, the assembly methods (e.g., high-temperature soldering) and the internal molding, cross-section distribution as well as attachment to the main structure, e.g., of the flow body, the structural part 1 withstands the operational conditions, e.g., flight loads.

With the invented sectional design of the sensor structure and an orifice number of e.g., 12 measuring orifices, such miniaturized sensor structures can be realized for a length in the range of 200 mm and 80 mm and a base surface diameter in the range of 150 mm and 60 mm e.g., in radomes of high-performance aircraft with conical shape. An integration for a radome overall length in the range of 500 mm to 3000 mm and a base surface diameter in the range of 500 mm and 1500 mm can thus be established functionally. This enables a miniaturized integration of the sensor structure and approximate maximization of the remaining radar-permeable radome surfaces. This way two main functions, such as radar radome system and air data system, can be optimized simultaneously and parallel by positioning them in the front extreme point of the flow body. Another advantage of such an integration with miniaturized sensor structure is the reduced radar back-scattering surface compared to flow-body external sensors. The area 21 should preferably be designed in the range between 15% and 60% of the overall length formed of the areas 21 and 22. Additional functional variations are possible by e.g., increasing or reducing the measuring orifices 5, by e.g., further miniaturizing the measuring/pressure converter system elements 13 and/or data processing elements 15 beneficially for flow data measurements and beneficially for the compatible integration with other sensors, e.g., radar, and structures with such an invented sectional design sequence 21, 22, 23.

The invented sensor structure with sensor arrangement is provided especially for use in agile high-performance aircraft and for conducting flow variable measurements there; they are measured in the form pressure and are resolved and/or correlated as the angles of incidence $\alpha$ and $\beta$ that are to be measured. The signal processing unit for the analog-to-digital transformation including temperature compensation can also be integrated into the realized sensor structure.

A closed temperature control circuit is formed with the heated front area 21, the heating elements and temperature sensors integrated there, as well as with the electric power source and control unit. The variable to be controlled is the surface temperature in the area 21 on the boundary layer to the flow medium and if necessary additionally the temperature in the installation space 22 and 23 of the pressure converter and data processing system. The manipulated variable is the electric power that is fed. Further control elements include the integrated temperature sensors as well as the external adjusting electronics.

Various alternatives are feasible as control concepts, of which two examples are mentioned in the following:

In a first alternative, the temperature is regulated in the frontal area, wherein the temperature difference results from the selection of suitable materials of the areas 21 and 22 with the existing ambient conditions of the flow medium.

In another alternative the temperature in the frontal area 21 and in the area 9 is regulated, wherein the temperature difference results from the selection of suitable materials of the areas 21 and 22 and from the maximum and minimum temperatures to be regulated in the areas 21 and 9 with the existing ambient conditions of the flow medium. The control process can be such that in the area of the support element (9) of the second area (22) a maximum temperature of 70° C. is not exceeded. For this, a temperature sensor 35 is preferably arranged in the interior of the first area 21.

In the structural part 1 and is the outer shell 3 the structural system and the structural stability are provided because, among other things, a beneficial sufficient soldering stability exists at high temperature, such as e.g., with nickel-chrome-phosphor or gold-nickel soldering materials and because thus with an achievably low inherent weight the structural cross-sections can still be sufficient for the flight load cases in the lateral and longitudinal directions.

In connection with the above features, this results in the following benefits: the capillaries 7 can be designed short and direct, thus avoiding a larger time difference as well as transmission influence during measurement; the temperature fluctuations between the entry position on the measuring orifice 5 and the measuring transducer system 13 can be kept low; the temperature can be adjusted lower in the measuring/pressure converter/data processing areas 13 and 15 compared to the high-temperature zone 21; with the high-temperature zone in the area 21 and the medium temperature zone in the area 22 condensation problems are drastically reduced; with the heating elements redrying ability of the transmission paths and the measuring surface can be accomplished.

REFERENCE LIST

1 Structural Part
3 Outer shell
5 Measuring Orifices
7 Transfer lines
9 Support Elements
11 Pneumatic Pressure Transmission Path
13 Measuring, e.g., Pressure converter System
14 Lines
15 Data Processing System
20 Frontal Contour of the Structural Part
21 Area 1
22 Subsequent Area
23 Subsequent Area
31 Heating Elements
33 Diameter of the Base Surface
35 Temperature Sensor

The invention claimed is:

1. A sensor structure of a flow body protruding into a flow for measuring flow states, said structure comprising:
a structural part with at least two measuring orifices
at least two transfer lines respectively are coupled to said at least two measuring orifices in order to guide a flow medium from the measuring orifices to a pressure converter system for the purpose of determining the flow states, wherein said structural part includes an outer shell containing a first and a second area which are arranged behind each other viewed in a direction of flow, wherein the first area has greater thermal conductivity than the second area, said first area having heating elements arranged on the structural part said heating elements being connected with a temperature control circuit with a temperature on an external surface of the first area being a control variable and said pressure converter system arranged within the second area.

2. The sensor structure for measuring flow states the at least two measuring orifices each have a cross-section in the range from 0.03 mm$^2$ to 30 mm$^2$ with a radius on an orifice edge of at most 0.1 mm.

3. The sensor structure for measuring flow states according to claim 2, wherein the at least two measuring orifices each have a circular cross-section with a circular diameter in the range of 1 to 1.8 mm.

4. The sensor structure for measuring flow states according to claim 1, wherein the temperature control circuit is adjusted such that on the surface of the first area the temperature does not drop below 95° C. and in the area of a support element of the second area (22) a maximum temperature of 70° C. is not exceeded.

5. The sensor structure for measuring flow states according to claim 1, wherein thermal conductivity in the first area is between 100 and 205 W/mK and in the second area between 90 and 15 W/mK.

6. The sensor structure for measuring flow states according to claim 1, wherein the transfer lines are connected with the measuring orifices through soldered connections or adhesive connections or screw assemblies.

7. The sensor structure for measuring flow states according to claim 1, wherein the first area is made of a ferromagnetic material.

8. The sensor structure for measuring flow states according to claim 7, wherein the first area contains a wolfram-copper alloy.

9. The sensor structure for measuring flow states according to claim 1, wherein a surface of the second area consists of a stainless steel or a nickel or cobalt base alloy.

10. The sensor structure for measuring flow states according to claim 1, wherein the structural part contains a radome tip of an air vehicle with a diameter of a base surface in the range between 60 and 150 mm, wherein a length of the first area in the direction of flow is between 15 and 60% of the longitudinal extension of the sum of the first and second areas.

11. The sensor structure for measuring flow states according to claim 10, said measuring orifices are in the quantity between 5 and 20.

12. The sensor structure for measuring flow states according to claim 10, wherein the temperature control is adjusted such that the temperature on said external surface of the first area is maximally 160° C.

13. The sensor structure for measuring flow states according to claim 11, wherein a longitudinal extension of the first and the second areas as well as the materials for their surfaces are selected such that between the first and the second areas a temperature decrease of at least 30° C. and maximally 90° C. is achieved.

14. Air vehicle with a structural part according to any one of claim 9 through 11.

* * * * *